(12) United States Patent
Anlage et al.

(10) Patent No.: US 6,376,836 B1
(45) Date of Patent: Apr. 23, 2002

(54) DISENTANGLING SAMPLE TOPOGRAPHY AND PHYSICAL PROPERTIES IN SCANNING NEAR-FIELD MICROWAVE MICROSCOPY

(75) Inventors: Steven Mark Anlage, Laurel, MD (US); Bokke Johannes Feenstra, Eindhoven (NL); David Ethan Steinhauer, Laurel, MD (US)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 09/473,961

(22) Filed: Dec. 29, 1999

Related U.S. Application Data
(60) Provisional application No. 60/124,300, filed on Mar. 12, 1999.

(51) Int. Cl.$^7$ .................................................. H01J 3/14
(52) U.S. Cl. ..................................... 250/234; 250/559.4
(58) Field of Search .............................. 250/234, 559.4, 250/559.27, 201.3, 306, 307; 356/372, 380, 381, 39

(56) References Cited

U.S. PATENT DOCUMENTS
4,642,468 A * 2/1987 Tabata et al. ................ 250/548

* cited by examiner

Primary Examiner—Que T. Le
(74) Attorney, Agent, or Firm—Arent Fox Kintner Plotkin & Kahn PLLC

(57) ABSTRACT

A method of disentangling sample properties in a scanned sample requires a calibration sample in which two sample properties are variable. The calibration sample is scanned, and two measured variables are recorded during the scan. The two sample properties are measured quantitatively by an independent means. Using the data from the calibration sample, conversion functions are mathematically determined, in order to convert the two measured variables into the two sample properties. A sample, for which the two properties are unknown, is scanned, and the two measured variables are recorded. Using the conversion functions, the data from the scan is converted into the two sample properties of interest for the unknown sample. This method can be used with the first sample property being topography, so that effects due to the topography of the sample are eliminated from the computation of the second property of the unknown sample. This method can also be used with the probe in contact with the sample, so that topography is not one of the two sample properties.

13 Claims, 15 Drawing Sheets

PROBE CENTER CONDUCTOR

Al
GLASS

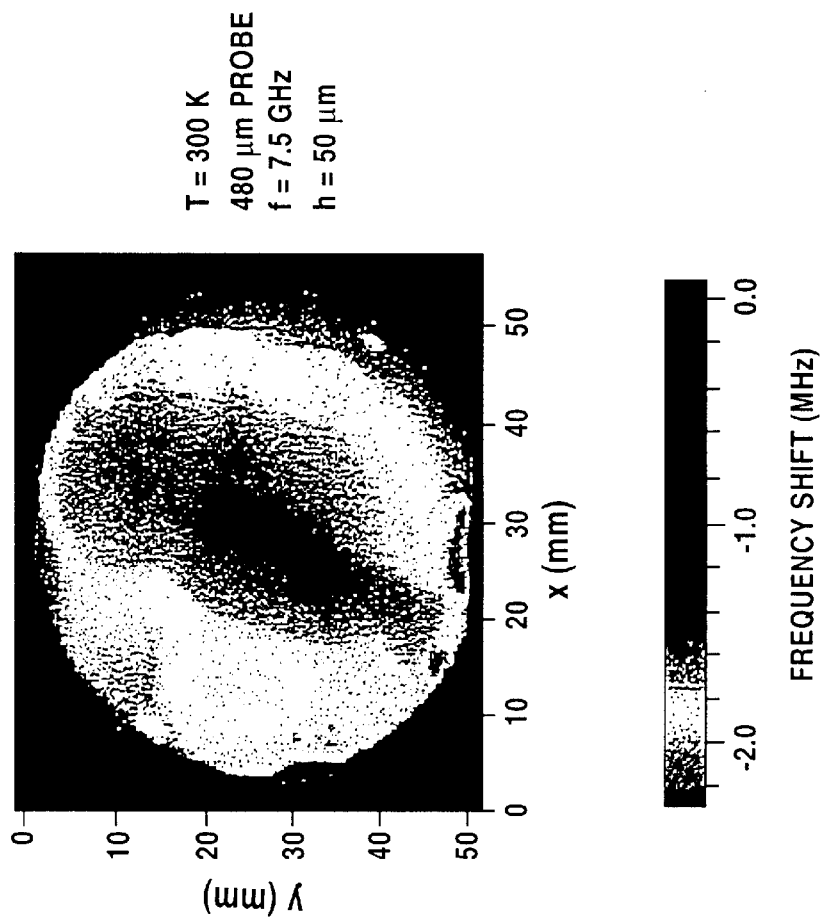
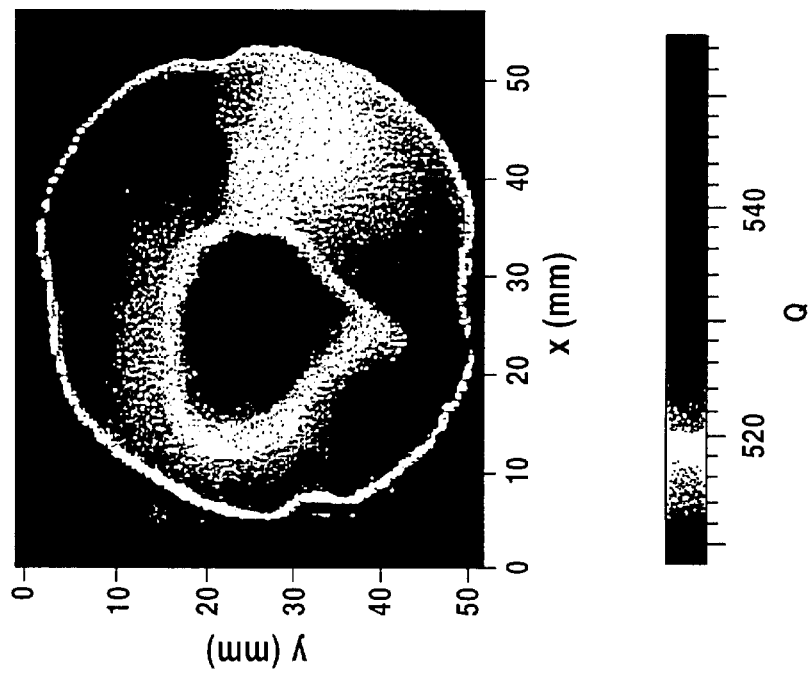
Fig.11(b)
Fig.11(a)
T = 300 K
480 μm PROBE
f = 7.5 GHz
h = 50 μm

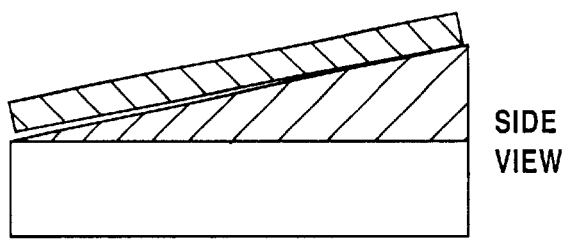
Fig.17B
VARIABLE SHEET RESISTANCE →
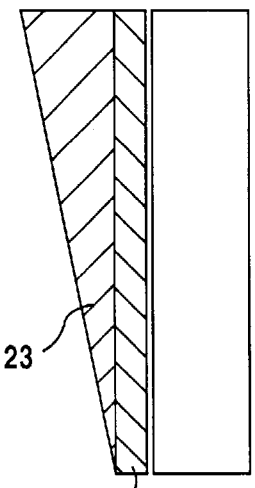
Fig.17C
SIDE VIEW
VARIABLE DIELECTRIC THICKNESS
23
22    21
Fig.17D
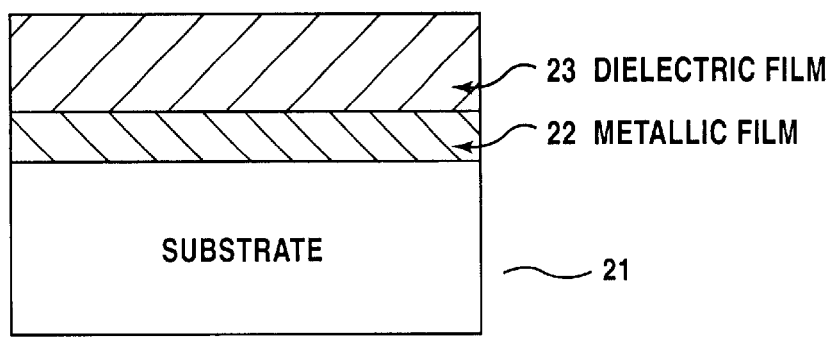
23 DIELECTRIC FILM
22 METALLIC FILM
SUBSTRATE    21

DISENTANGLING SAMPLE TOPOGRAPHY AND PHYSICAL PROPERTIES IN SCANNING NEAR-FIELD MICROWAVE MICROSCOPY

This application claim benefit to provisional application 60/124,300 Mar. 12, 1999.

This invention was made with Government support under Contract DMR9632521 awarded by the National Science Foundation. The Government has certain rights in this invention.

BACKGROUND OF THE INVENTION

1. Field of the Invention

The invention is directed to a method to deconvolve the influence of variable height (topography) from the variation of a sample property such as sheet resistance, dielectric constant, magnetic permeability, etc., in scans taken with scanning devices such as a near-field scanning microwave microscope. Such scanning devices like a microwave microscope simultaneously measures two quantities during a scan. These two quantities can include frequency shift error signal from a feedback loop ($\Delta f$), and the quality factor of the microscope resonator (Q). The invention utilizes this data to uniquely determine a physical property of the sample, as well as its topography. This Application claim benefit to provisional Application No. 60/124,300 Mar. 12, 1999.

2. Background of the Invention

In trying to measure a sample property, such as sheet resistance, with precision scanning devices, variations in the sample property will show up in both the feedback loop ($\Delta f$) and quality factor (Q) data. However, in addition, variations in sample topography, which cause the height h (the separation between the probe and the sample) to be variable, will also influence the $\Delta f$ and Q data. Therefore, conventional systems and methods may mistakenly interpret variations in data as coming from sample property variations, when in fact it is coming from topography. The present invention, therefore, addresses the need to uniquely separate the influences of sample topography and sample property variations into two separate images.

SUMMARY OF THE INVENTION

In order to provide the advantages noted above, a method of disentangling sample properties in a scanned sample comprises scanning a calibration sample on a sample stage, with the calibration sample being scanned in a direction of variation of a sample property of interest. The scan is performed at a plurality of heights. Values representing a first variable and a second variable are recorded for the calibration sample during the scan. Quantitative measurements of the sample property of interest are made using an independent means at a plurality of points across the calibration sample. The quantitative measurements are used to generate calibration data regarding the first variable and the second variable for the calibration sample, such that effects due to sample topography are eliminated from the recorded data. Conversion functions are mathematically determined using the calibration data, to convert the first and second measured variables into height and the sample property of interest. An unknown sample is scanned, and the first variable and second variable are measured during the scan, and recorded. An image of the sample property of interest for the unknown sample is mathematically determined by combining the conversion functions with the first variable and second variable for the unknown sample.

The method also includes the steps noted above, wherein the first variable is frequency shift and the second variable is quality factor Q, and wherein the property of interest is sheet resistance.

In a second embodiment of the invention, the sample is held in contact with the probe, so that height is no longer a variable. In this embodiment, there are two sample properties, and topography no longer has an effect.

This invention can be utilized, for example, with a probe which is a coaxial cable with an open end, or with a probe which is a coaxial cable with the center conductor connected to the outer conductor by a loop.

BRIEF DESCRIPTION OF THE DRAWINGS

For a proper understanding of the disclosed embodiments of the present invention, reference should be made to the appended drawings wherein:

FIGS. 11(a) and 11(b) illustrate frequency shift and Q images of an unknown sample based upon an exemplary scan;

FIGS. 17A–17C illustrate top and side views of a calibration sample, with varying sheet resistance and varying dielectric thickness.

DETAILED DESCRIPTION OF THE PREFERRED EMBODIMENTS

The present invention, as noted previously, is a method and apparatus for deconvolving the influence of a variable topography, and other variations, from the variations of sample properties which are sought to be measured such as sheet resistance, dielectric constant, magnetic permeability, etc., in scans taken with precision scanning devices such as a near-field scanning microwave microscope. Such a precision scanning device is disclosed, for example, in U.S. Pat. No. 5,900,618; the contents of this patent is hereby incorporated by reference. In such a near-field scanning microwave microscope, a scan of a sample is performed with an exposed end of a probe, in either a contacting or non-contacting mode. The probe is at one end of a microwave transmission line resonator. The exposed end of the probe has an electric field associated therewith, provided primarily through a microwave source which is coupled to the resonator through a coupling capacitor. This electric field is perturbed by the sample as the sample passes beneath the probe. Using a diode detector, a voltage signal is created which is proportional to the power reflected from the resonator. From this signal, it is possible to determine the quality factor (Q) of the resonant coaxial transmission line or resonator, as well as the frequency shift ($\Delta f$) as a frequency shift error signal from a feedback loop. Using these two quantities, physical properties of the sample can be determined. The invention is directed to a method which enables accurate assessment of physical properties of the sample, through the disentangling of certain variables, such as sample topography, from the measured quantities which are used to determine the physical properties. These measured values can be used to determine such physical properties as sheet resistance, magnetic permeability, kinetic inductance (typically relating to superconductors), ferromagnetic properties, dielectric constant, etc.

Figure 18:
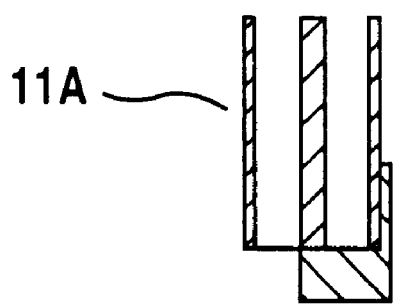
FIG. 18 illustrates a magnetic loop probe according to the present invention.

A similar sequence of events directly analogous to those described above can be employed for a magnetic loop probe, as illustrated in FIG. 18. Magnetic loop probe 11a creates an oscillating magnetic field, and is inductively coupled to the sample.

Figure 1:
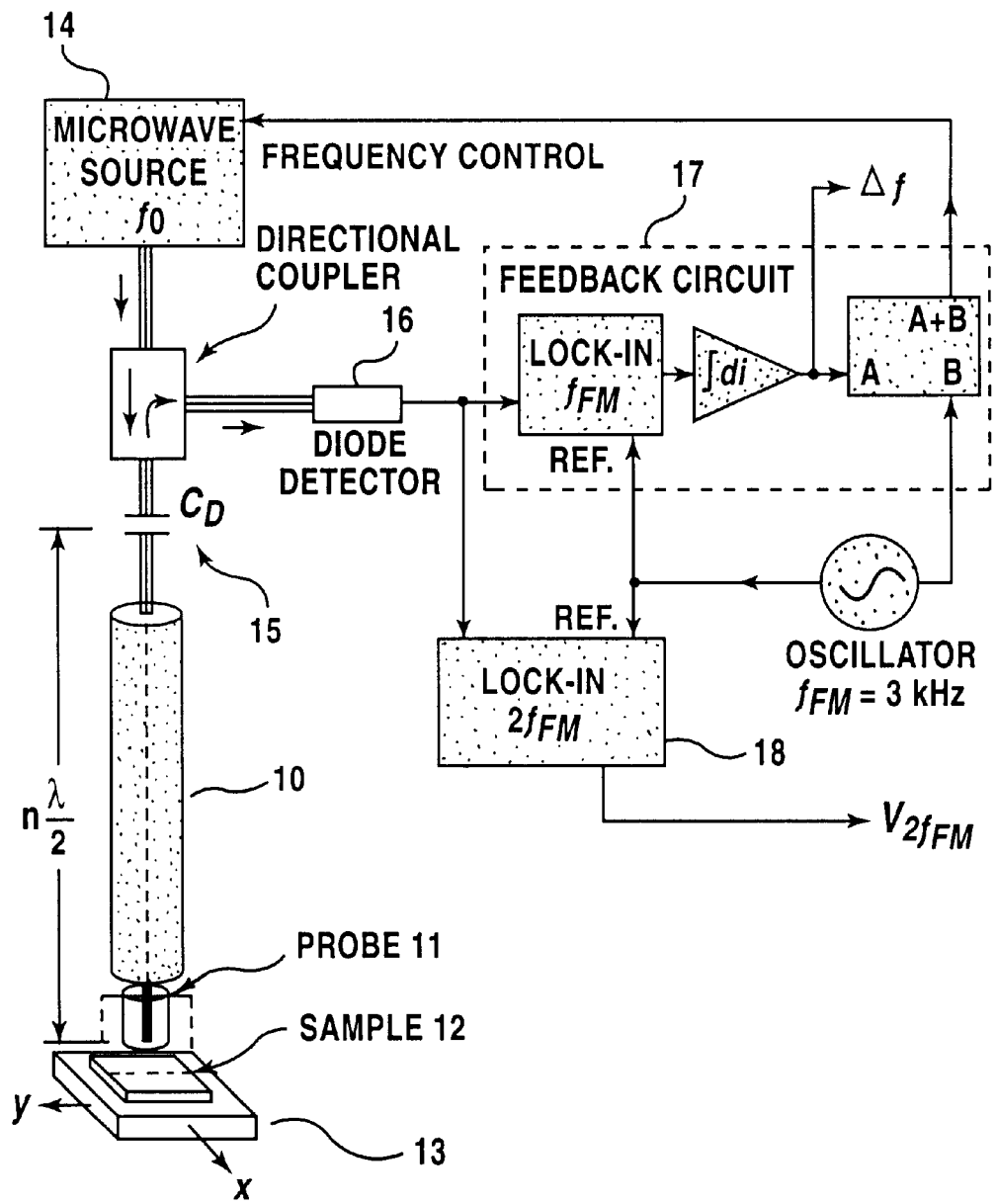
FIG. 1 illustrates a near-field scanning microwave microscope system necessary in order to generate known quantities for determining unknown quantities relating to a sample.

Referring to FIG. 1, an example of an embodiment of the present invention includes resonant coaxial transmission line 10 connected to an open-ended probe 11, which is intended to be disposed adjacent or in contact with a sample 12 which is disposed on a sample table or stage 13, which is movable in the X-Y-Z directions. A microwave source 14 is coupled to transmission line 10 through a decoupler such as decoupling capacitor 15, having a capacitance $C_D$, so as to create an electric field at the tip of probe 11. As sample 12 is moved beneath the probe tip, and in particular the probe center conductor, the electric field at the probe tip becomes perturbed by the sample, resulting in $\Delta f$ and Q being perturbed. Diode detector 16 gives a measure of the perturbations, producing a voltage signal which is proportional to the power which is reflected from the resonator. A feedback circuit 17 modulates the microwave source 14 frequency of a rate $f_{FM}$ and keeps microwave source 14 locked to a resonant frequency of the transmission line. Lock-in amplifier 18, which is referenced at $2f_{FM}$, provides an output voltage $V_{2fFM}$, which is related to the curvature of a power versus frequency curve which is reflected on resonance. This value is therefore related to quality factor Q. The relationship between $V_{2fFM}$ and Q is made by positioning a microwave absorber at various heights below the tip of probe 11, thus varying Q. The absolute reflection coefficient of the resonator is then measured. If $|\rho_0|^2$ is the reflection coefficient at a resonant frequency $f_0$, then the coupling coefficient between the source and the resonator is $\beta=(1-|\rho_0|)/(1+|\rho_0|)$. The loaded quality factor of the resonator is $Q_L=f_0/\Delta f$, where $\Delta f$ is the difference in frequency between the two points where $|\rho|^2=(1+\beta^2)/(1+\beta)^2$. The unloaded quality factor, which is the Q of the resonator without coupling to the microwave source and detector, is then $Q_0=Q_L (1+\beta)$. We also measured $V_{2fFM}$, and found that there is a unique functional relationship between $Q_0$ and $V_{2fFM}$; thus, we need to calibrate this relationship only once for a given microwave resonance. In a typical scan, we record $V_{2fFM}$, and afterward convert $V_{2fFM}$ to $Q_0$.

Figure 2:
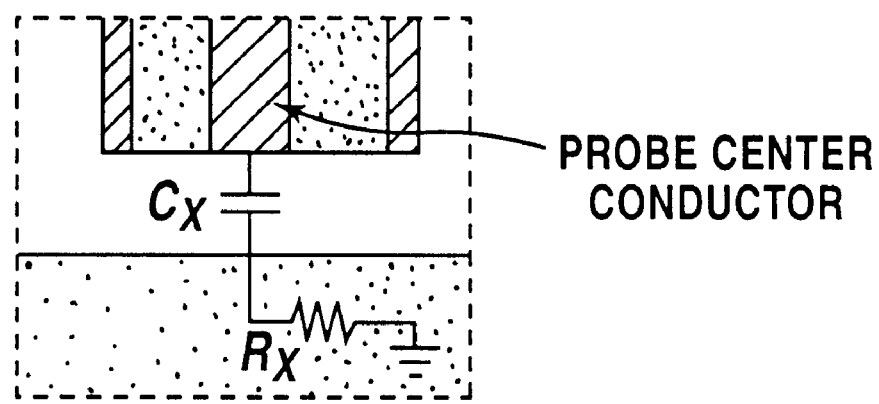
FIG. 2 illustrates an equivalent circuit formed between the probe and the sample for an open-ended probe.

FIG. 2 illustrates the equivalent circuit which is formed between the probe center conductor and a sample such as a microwave absorber. Capacitance $C_x$ exists between the probe center conductor and the surface of the sample, and sheet resistance $R_x$ is as shown.

Figure 3:
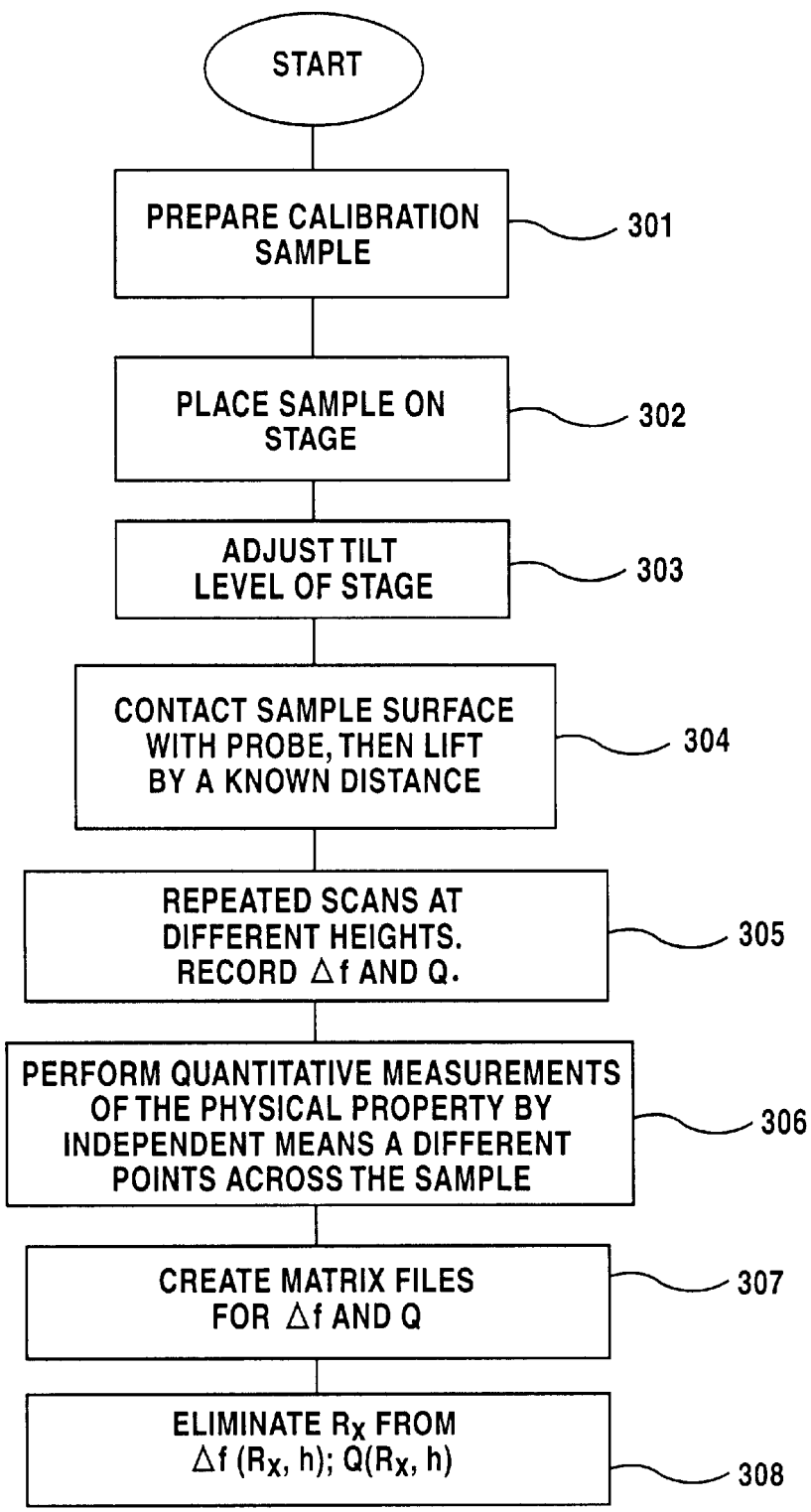
FIG. 3 illustrates steps necessary to perform a calibration in a non-contact mode according to the invention.

Once the determinations regarding $Q_0$ and $\Delta f$ are made, relationships can then be determined between $Q_0$, $\Delta f$, and the physical property which is sought to be determined. In the case of sheet resistance $R_x$, as an example, FIG. 3 illustrates a process which is used to calibrate the microscope for the determination of the property. In step 301, a calibration sample is prepared, which has the property of interest, such as sheet resistance, varying across the sample. Sheet resistance can be varied by varying the thickness of a conducting thin film. At step 302, the sample is placed on sample stage 13, and in step 303, the tilt or level of the sample stage is adjusted so that the sample is parallel to the X and Y axes. At step 304, the probe is moved downward along the Z-axis such that the tip of the probe comes into contact with the sample. This location provides an indication of zero height. The probe is then backed up or moved upward out of contact of the sample, so that the tip of the probe is a known distance from the sample.

At step 305, the sample is then scanned in the direction of variation of the sample property. In the case of scanning for sheet resistance, the scan is moved in a direction from a small thickness to a large thickness, or a large thickness to a small thickness. Frequency shift $\Delta f$ and quality factor Q are recorded while scanning. The scans are repeated at different heights. At step 306, a plurality of quantitative measurements (independent of the microwave microscope) of the desired physical property are taken at a plurality of points across the sample. If the physical property is sheet resistance, then a plurality of sheet resistance measurements are made at numerous points across the sample. It should be noted, however, that the quantitative measurements of step 306 can be performed at any time, including before the placement of the sample on the sample stage, or before the repeated scanning of step 305.

Figure 7:
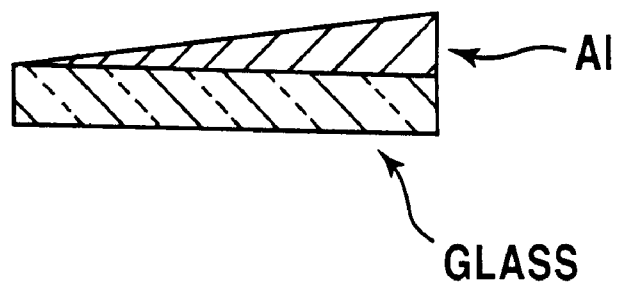
FIG. 7 illustrates an example of a calibration sample shown in cross-section.
Figure 5:
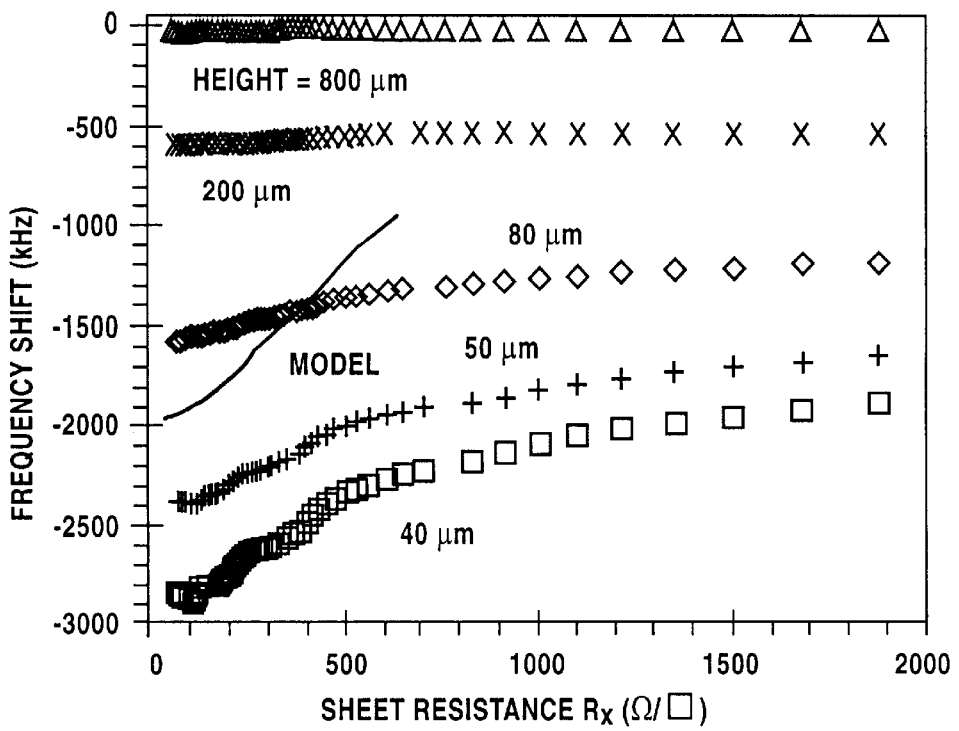
FIG. 5 is a graph of frequency shift versus sheet resistance for a number of scans of a calibration sample, with the labels indicating height of the probe above the sample.
Figure 6:
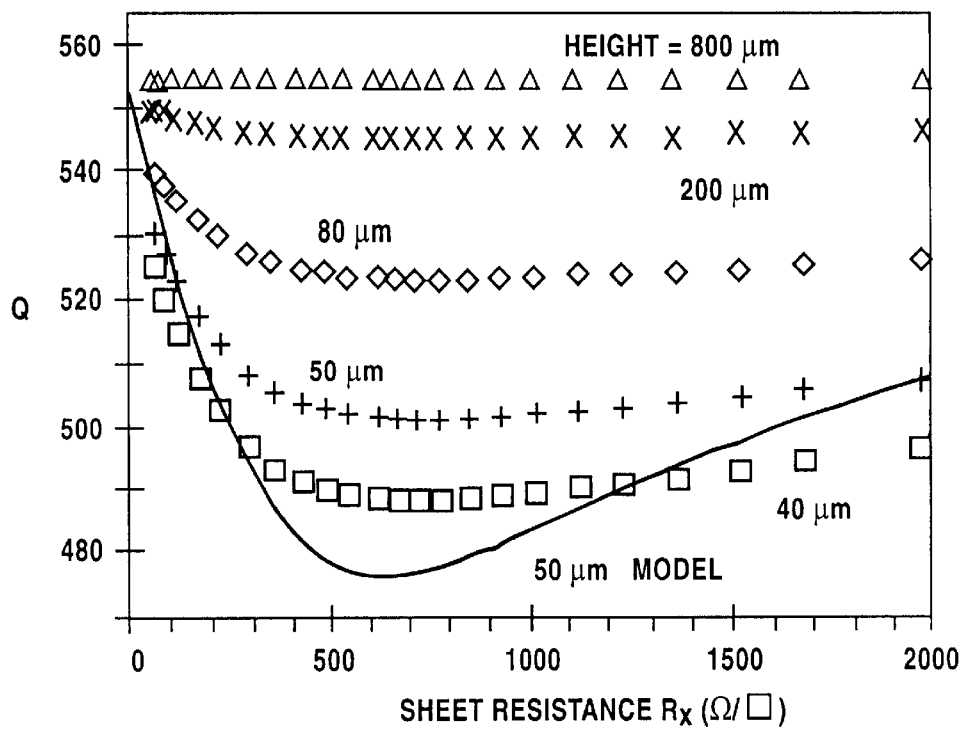
FIG. 6 illustrates Q versus sheet resistance at a number of heights above the calibration sample.

FIG. 5 illustrates the matrices of step 307 based upon the repeated scans and different heights of step 305. FIG. 5 illustrates frequency shift ($\Delta f$) versus sheet resistance, and FIG. 6 illustrates Q versus sheet resistance. This data is taken at a frequency of 7.5 gigahertz (GHz) with a 480 micrometer diameter center conductor probe, with data taken at heights of 40 $\mu$m, 50 $\mu$m, 80 $\mu$m, 200 $\mu$m, and 800 $\mu$m. The calibration sample was a varying-thickness aluminum film on a glass substrate, as illustrated in FIG. 7. To obtain the quantitative measurements of step 306, after the repeated scans of step 305, the aluminum thin film was cut into narrow strips, and two-point resistance measurements were taken to determine the local sheet resistance. As shown in FIG. 6, as sheet resistance approaches zero, Q reaches a maximum. As sheet resistance $R_x$ increases, Q drops due to losses from currents induced in the sample, reaching a minimum for a sheet resistance of approximately 660 $\Omega/\square$, for a height of 50 $\mu$m. As sheet resistance increases toward infinity, Q increases due to diminishing currents in the sample.

With respect to FIG. 5, as expected, relative frequency shift is higher at the reduced heights.

Once the values have been obtained for $\Delta f$ and Q, as a function of $R_x$ and h, the invention uses these known quantities to find the unknown quantities of height (topography) and sheet resistance $R_x$.

Figure 4A:
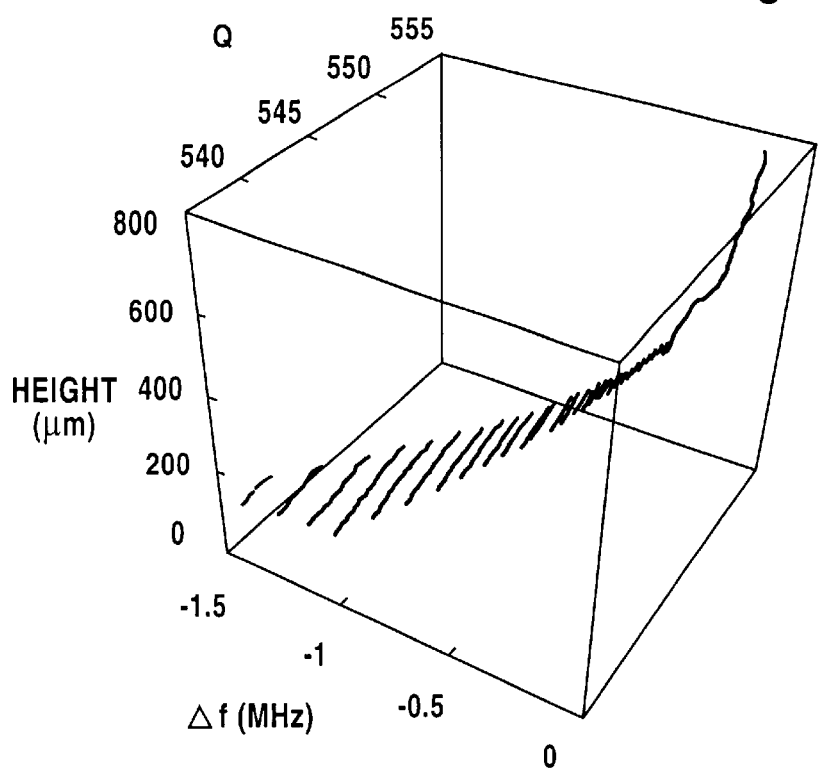
FIGS. 4A and 4B illustrate surfaces representing data according to the invention.
Figure 8:
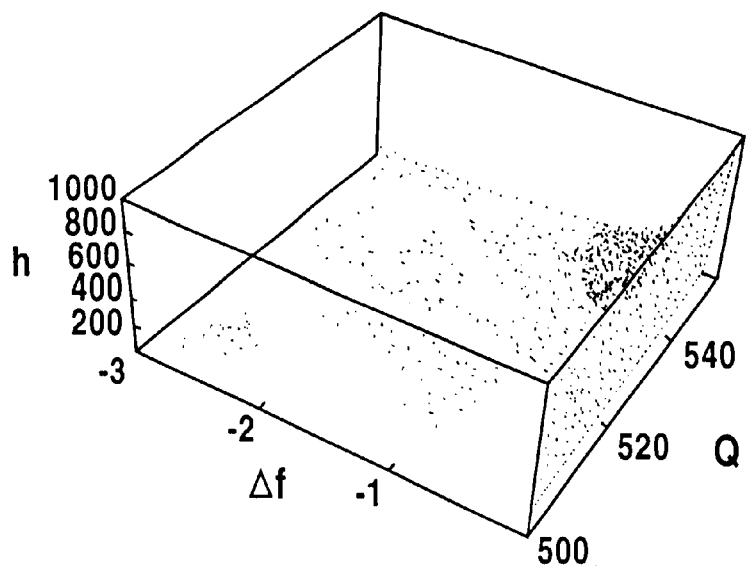
FIG. 8 illustrates a surface plot of height as a function of $\Delta f$ and Q according to the present invention.

At step 307, the data from the sample is placed in two computer-readable files in matrix form. The first file should contain the recorded $\Delta f$ data from the plurality of heights, and the second file should contain the Q data from the plurality of heights. The first column of the matrices should have the data regarding the heights (h), and the first row should have the value of the sample property as measured in step 306. At step 308, the sample property $R_x$ is eliminated from the calibration data $\Delta f(R_x, h)$; $Q(R_x, h)$, by creating a list with three columns; $\Delta f$, Q, and h. These data points can be plotted on a 3-D surface plot, yielding a "surface" as illustrated in FIG. 4A. The discrete data for h can then be fit to a three dimensional surface function, to yield a "surface" as illustrated in FIG. 8. Such a surface function, therefore, can be as follows:

$$h(\Delta f, Q) = A + B_1/\Delta f + B_2/Q + B_3/(\Delta f\, Q + B_4) + C_1 \Delta f + C_2 Q + C_3 \Delta f\, Q \quad (1)$$

where A, $B_1$, $B_2$, $B_3$, $B_4$, $C_1$, $C_2$, and $C_3$ are fitting parameters. These parameters are found by minimizing the difference between the surface function and the real data. FIG. 8 shows an example of such a surface function.

This surface function combines the frequency shift and Q images of a sample with an unknown property and an unknown topography and enables the computation of the topography (h) as a function of position, as long as the topographic features are within the range of calibration.

Figure 4B:
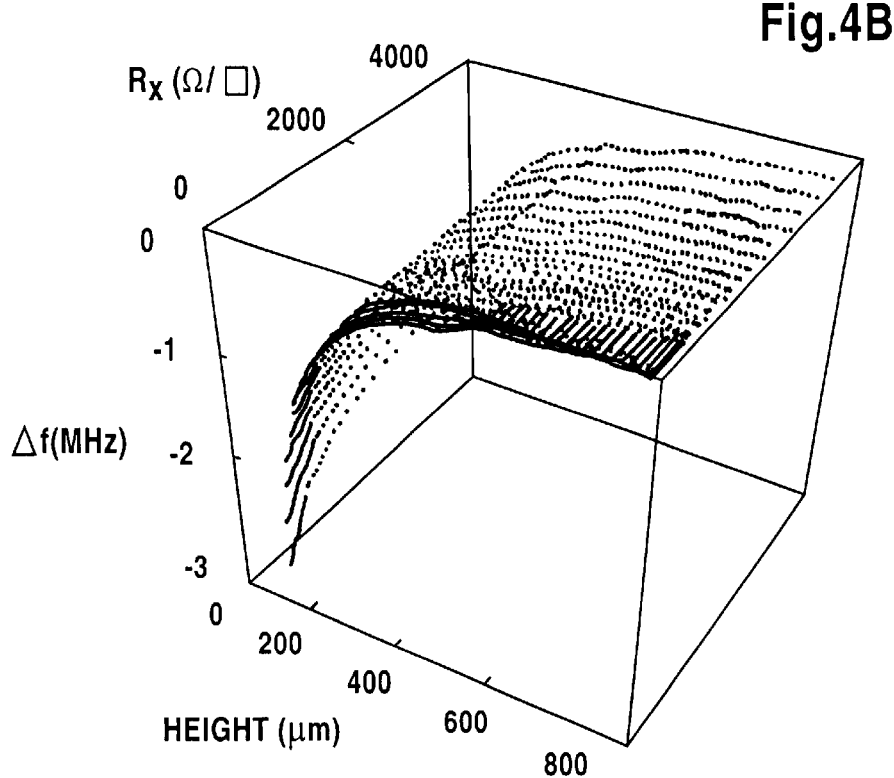
Figure 9:
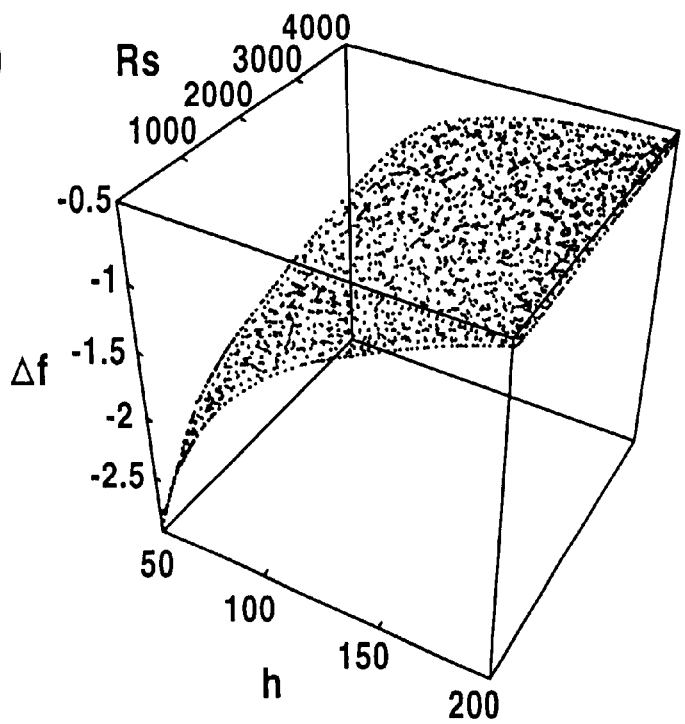
FIG. 9 illustrates a surface plot representing frequency shift versus sheet resistance and height as determined according to the present invention.

$R_x(\Delta f, Q)$ can also be determined by taking the calibration data and eliminating the height h instead of $R_x$. This data can be fit to a surface and the value of $R_x$ can then be directly deduced from the measured $\Delta f$ and Q. However, we have found that this $R_x(\Delta f, Q)$ surface is very steep and non-monotonic. It is therefore difficult to accurately fit, and leaves some ambiguity in determining the correct $R_x$ value. An alternative, therefore, is to fit a surface to the calibration data $\Delta f(R_x, h)$. This calibration surface is shown in FIG. 4B. This surface can be fit to a form such as this:

$$\Delta f(R_x, h) = A + B_1/h + B_2/R_x + B_3/(h\, R_x + B_4) + C_1 h + C_2 R_x + C_3 h\, R_x \quad (2)$$

as shown where A, $B_1$, $B_2$, $B_3$, $B_4$, $C_1$, $C_2$, and $C_3$ are fitting parameters. An example of this fit surface is shown in FIG. 9. Once these parameters have been determined, we utilize a numerical equation solving method such as Newton's Method, and solve this function for the sheet resistance $R_x$ at position (x,y) using the height h at (x,y) calculated above, and the measured $\Delta f$ at (x,y). This can be accomplished in MATHEMATICA (tm) or other programming languages, and one must be careful to retain only the physically reasonable solutions.

This gives a prescription for combining the frequency shift and Q images of an unknown sample and plotting its sheet resistance variation as a function of position, as long as the sheet resistance features and heights h are in the range of the calibration.

Figure 14:
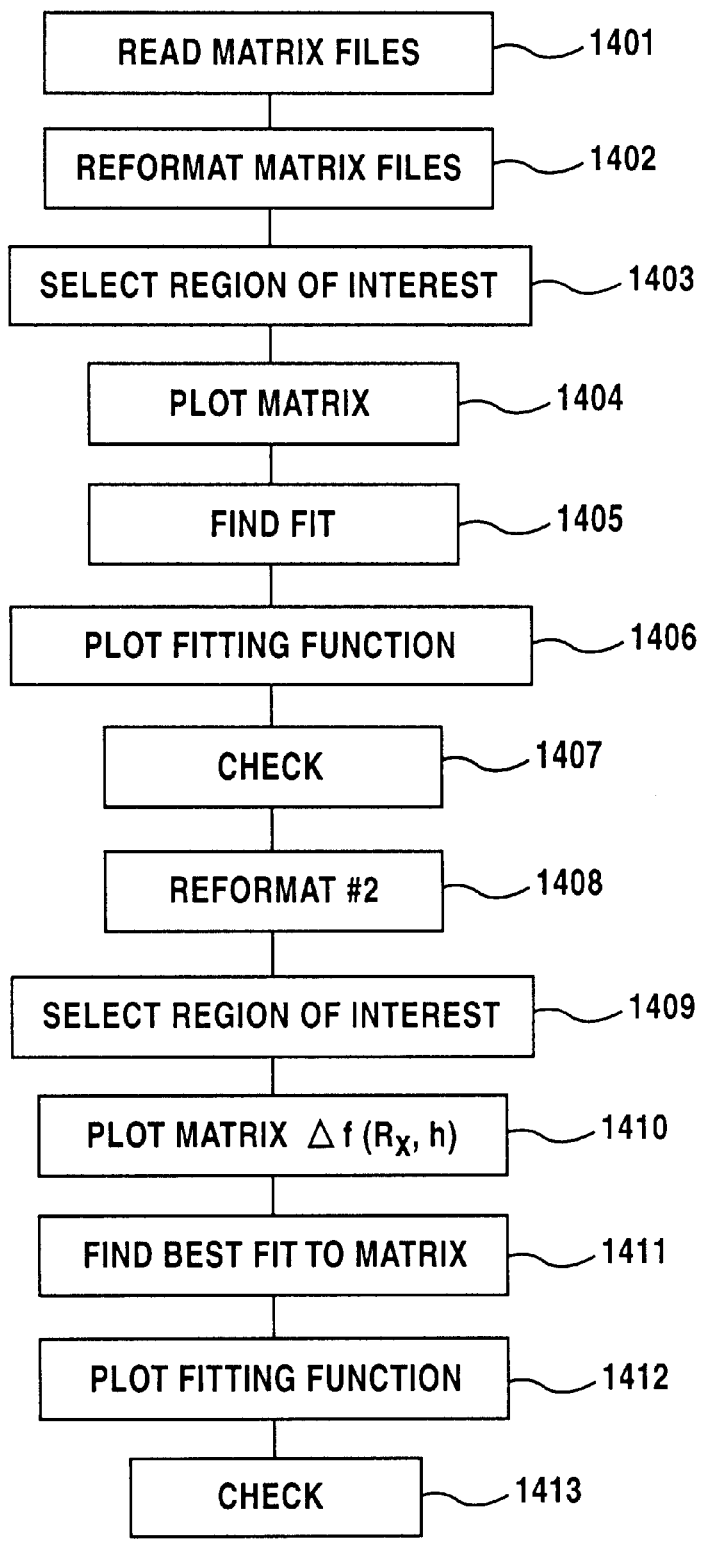
FIG. 14 is a flow chart illustrating the steps associated with generating an appropriate fitting function during the calibration steps.

The steps which are performed by a MATHEMATICA (tm) program referred to as Determine Fits.NB are illustrated in FIG. 14, and utilize the fitting functions discussed above. In step 1401, matrix files of the calibration data for $\Delta f$ and Q are read in to the software after the working directory and necessary packages have been set and initialized. The calibration files are then reformatted at step 1402, into three columns. The three columns are $\Delta f$, Q and height h, and the columns are sorted on ascending $\Delta f$. This is the format which is required for an appropriate plotting program such as ScatterPlot3D command in MATHEMATICA (tm), which is used for plotting the matrices. This format can be used because $\Delta f$ and Q are measured at exactly the same values of height h and the physical property such as sheet resistance $R_x$. This enables elimination of $R_x$. The region of interest in $\Delta f$ of the calibration can then be selected at step 1403, if appropriate, such that the best possible fit of surfaces can be made for the region of interest. The matrix $h(\Delta f, Q)$ is then plotted using the ScatterPlot3D (tm) command, at step 1404. At step 1405, a best fit to $h(\Delta f, Q)$ is found. As an example, the form shown in equation (1) can be used. However, other functions may also be available. At step 1406, the fitting function $h(\Delta f, Q)$ is plotted, and at step 1407, the accuracy of the fitting function is checked by plotting the error in height h, $\Delta h$, as a function of $\Delta f$ and Q. The fitting function and the data can be shown in a single plot, if desired. At step 1408, the calibration files are again reformatted into three columns of height, $R_x$, and $\Delta f$, this time with the columns based on ascending height for appropriate plotting with ScatterPlot3D. In step 1409, the region of interest (a range of heights) can again be selected, and again the matrix is plotted at step 1410. In step 1411, the best fit is found to $\Delta f(R_x, h)$. Equation (2) is an example of a fitting function. The fit can be weighted in order to enhance the significance of regions where frequency shift $\Delta f$ becomes small. The fitting function $\Delta f(R_x, h)$ is then plotted at step 1412, and at step 1413, the accuracy of the fitting function is then checked by plotting the error in $\Delta f$, $\Delta \Delta f$, as a function of $R_x$ and h. This program, therefore, essentially takes the calibration surface data and constructs two surface fit functions. These two surface fit functions are $\Delta f$ as a function of $R_x$ and h, and Q as a function of $R_x$ and h.

A second method of handling the calibration data is as follows. Plot the calibration data as two surfaces, $\Delta f(R_x, h)$, $Q(R_x, h)$. Take the measured $\Delta f$ and Q values obtained at one point over the unknown sample. These data points represent horizontal planes in the $\Delta f(R_x, h)$ space and the $Q(R_x, h)$ space, respectively. These planes intersect the $\Delta f(R_x, h)$ and $Q(R_x, h)$ surfaces in the form of lines. Then, project the two lines found above into the $(R_x, h)$ plane. There should be a single point of intersection of these two lines in the $(R_x, h)$ plane. This is the unique solution for the height and sheet resistance of the sample at the point where the $\Delta f$ and Q combination were measured.

Figure 10:
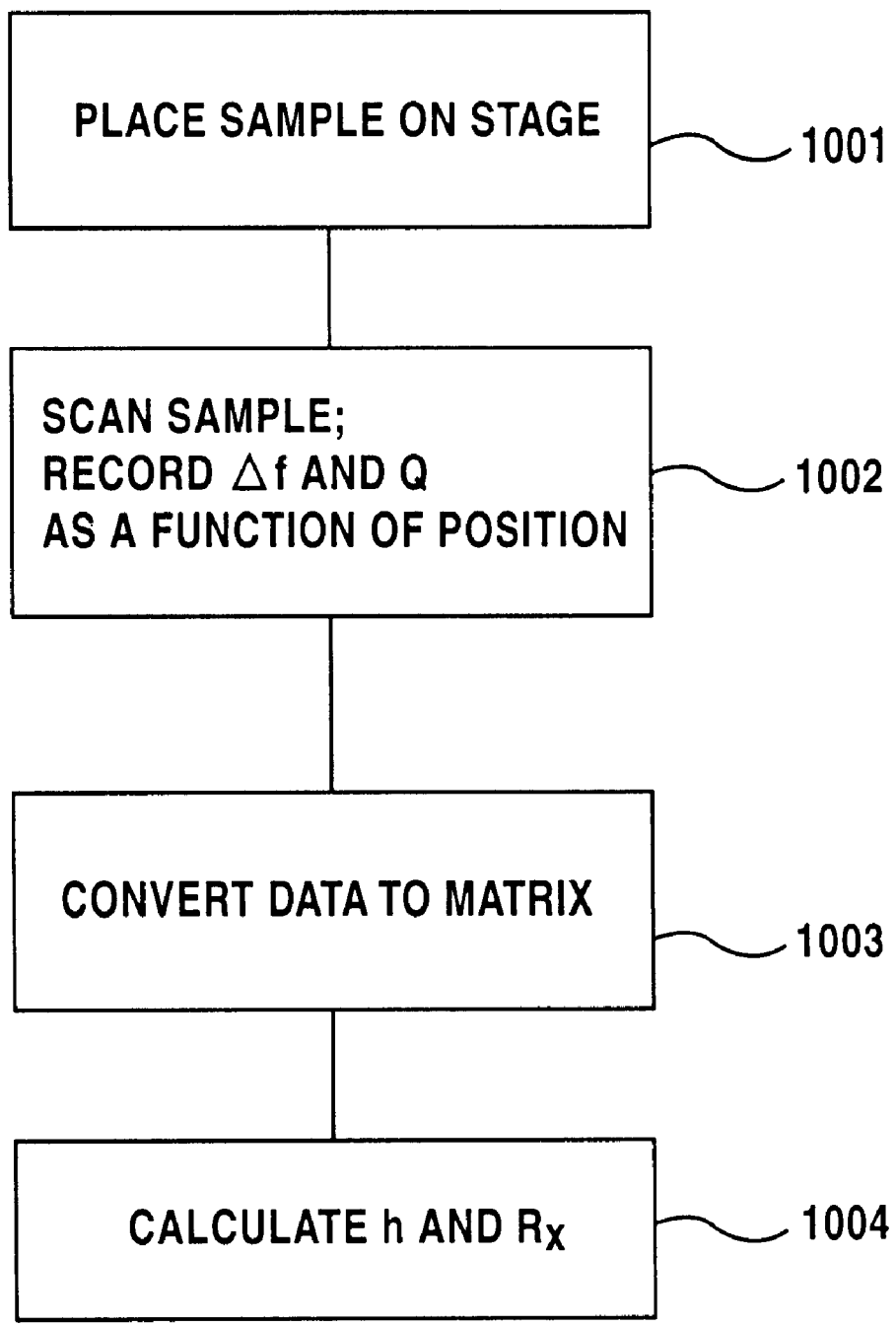
FIG. 10 illustrates the steps of scanning and determining topography and sheet resistance according to the invention.

FIG. 10 illustrates the steps which are followed in order to scan a sample with unknown properties and to convert $\Delta f$ and Q into the appropriate values, for the non-contact mode which was calibrated according to FIG. 3. In step 1001, an appropriate sample having an unknown variation of the property of interest, such as sheet resistance $R_x$, is placed on the sample stage, and the stage is appropriately levelled. In step 1002, the sample is scanned, and $\Delta f$ and Q are recorded as a function of position.

In step 1003, the data is stored in a matrix form, with the first row of the matrix being the x-coordinate, and the first column being the y-coordinate. One matrix contains the $\Delta f$ data, and one matrix contains the Q data. In step 1004, the scan data matrices are input to a software program which utilizes the fitting functions such as equations (1) and (2) from the calibration steps in order to output the desired sample property such as sheet resistance $R_x$, and the height h. In one embodiment of the present invention, a MATHEMATICA (tm) program entitled "Calculate h and $R_x$ From Data.NB" is run. The program outputs two image matrix files, with one containing the sample property, and the other containing height (topography) as a function of position.

Figure 15:
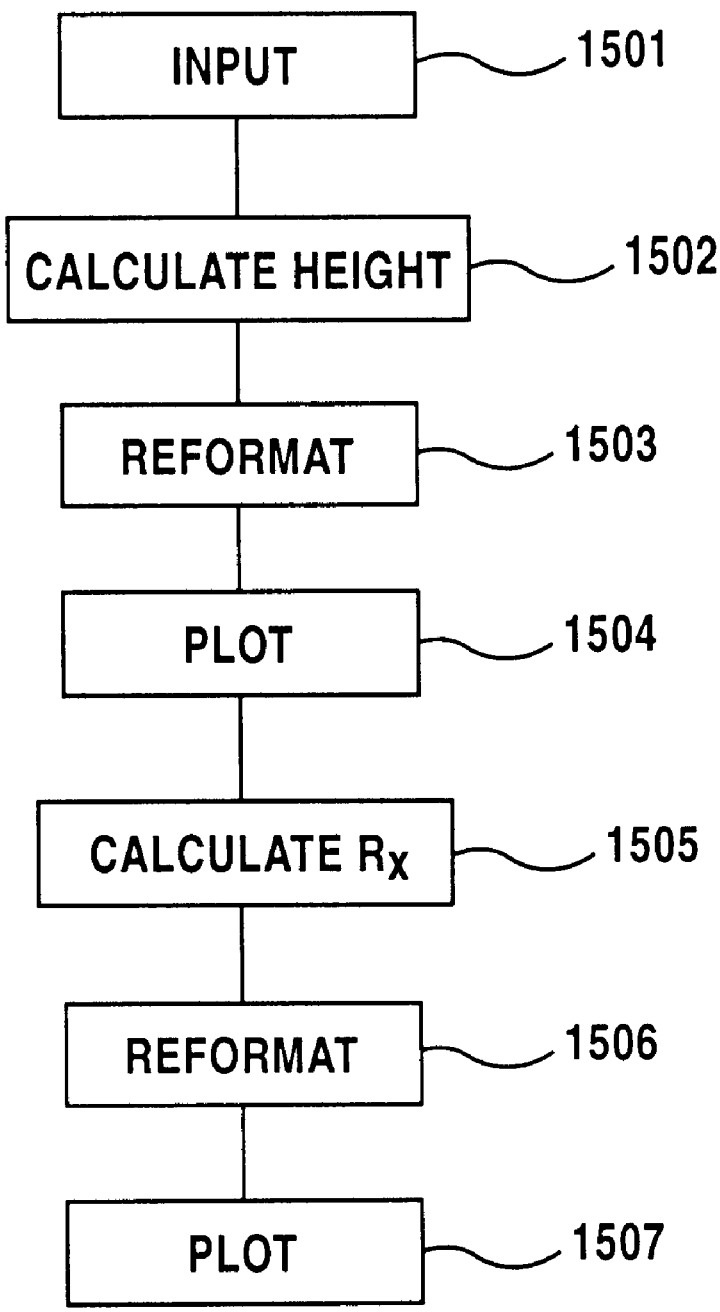
FIG. 15 illustrates the steps performed by software associated with the appropriate determination of the desired physical property such as sheet resistance.

An example of the operation of the program entitled "Calculate h and $R_x$ from Data.NB" is illustrated in FIG. 15. After calibration and scanning as discussed above, and after the working directory for the software has already been set, the fitting function for h($\Delta$f, Q) is input, as well as the data files from the scan of the sample, regarding $\Delta$f (x, y), and Q (x, y) at step 1501. The height h is then calculated at step 1502 from the data, using the fitting function h($\Delta$f (x, y), Q(x, y)), such that the output is h(x, y). This calculation also results in a matrix. The matrix is then reformatted at step 1503, in three columns h, x, and y, for plotting purposes. At step 1504, the reformatted matrices are plotted using the ScatterPlot3D (tm) command. The physical property $R_x$ is then calculated at step 1505, having the input of the fit regarding $\Delta$f($R_x$, h), which is determined in the previously-discussed program (determine fits.nb), the data file $\Delta$f(x, y), and h(x, y) from step 1502. For this calculation, the fitting function $\Delta$f($R_x$(x, y), h(x, y)) is used. The known quantities are $\Delta$f(x, y) and h(x, y). Therefore, $R_x$(x, y) is found at step 1505 by solving the equation $\Delta$f($R_x$, h) using a numerical equation-solving method such as Newton's Method. The solutions are selected within set limits, to eliminate non-physical solutions. The output, therefore, is the physical property such as sheet resistance $R_x$(x, y).

The resulting matrix is then reformatted in three columns $R_x$, x, and y, at step 1506 for plotting purposes. Once again using the ScatterPlot3D (tm) command, the matrix from step 1506 is then plotted at step 1507. This plotting results in the appropriate surface data regarding the physical property of sheet resistance over the region of the scan.

Attached is an example of a MATHEMATICA (tm) program entitled "Determine Fits.NB", and a second MATHEMATICA (tm) program entitled "Calculate h and $R_x$ from Data.NB", which perform the determination of the surfaces based upon the calibration, and which calculate height and sheet resistance from the scanning data of FIG. 10. These programs carry out the steps discussed with respect to FIGS. 14 and 15, respectively.

In summary, the invention seeks to measure two "surfaces", with the two surfaces being $\Delta$f and Q as a function of height h and a sample property such as sheet resistance $R_x$. From these two surfaces, two new data sets representing the physical property such as sheet resistance $R_x$ and height h as a function of position can be obtained for an unknown sample, using the calibration surfaces. The surface representing the calibration data for height, with $R_x$ eliminated, is shown in FIG. 4A, and the surface representing the calibration data for sheet resistance $R_x$ is shown in FIG. 4B. These two surfaces are used to convert $\Delta$f (x, y) and Q (x, y) for an unknown sample into h (x, y) and $R_x$ (x, y).

It should be noted that depending upon the physical property which is sought to be measured, the calibration sample and the unknown sample may require the use of the same type of substrate, due to the fact that the $\Delta$f and Q values measured by the microscope may be sensitive to the dielectric properties of the substrate. Additionally, when the fitting of the different surfaces yields multiple solutions for the physical property, it is possible to utilize the known quantities of $\Delta$f, Q and h, along with the multiple solutions for the physical property, and refer back to the calibration data sets generated during the calibration steps. The set of quantities for $\Delta$f, Q, h, and the physical property such as sheet resistance which falls closest to the calibration surfaces will identify the proper solution for the physical property.

Figure 12B:
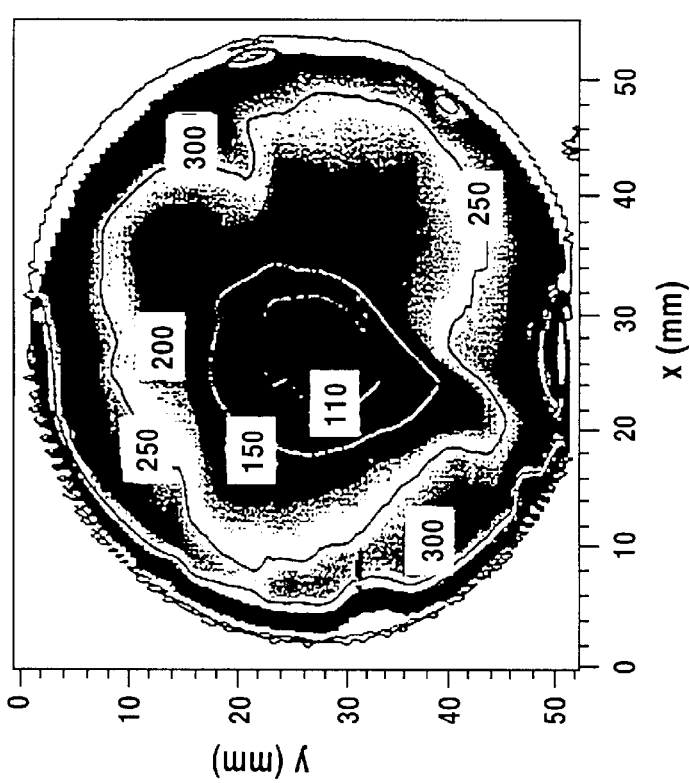
FIGS. 12A and 12B illustrate a plot of topography and sheet resistance based upon the images of FIG. 11.
Figure 12B:
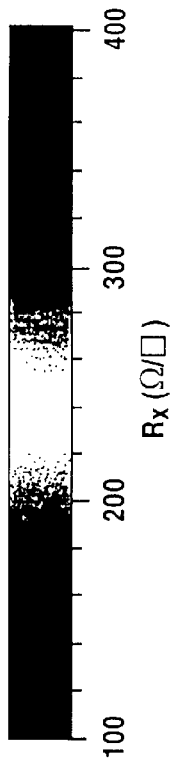
Figure 12A:
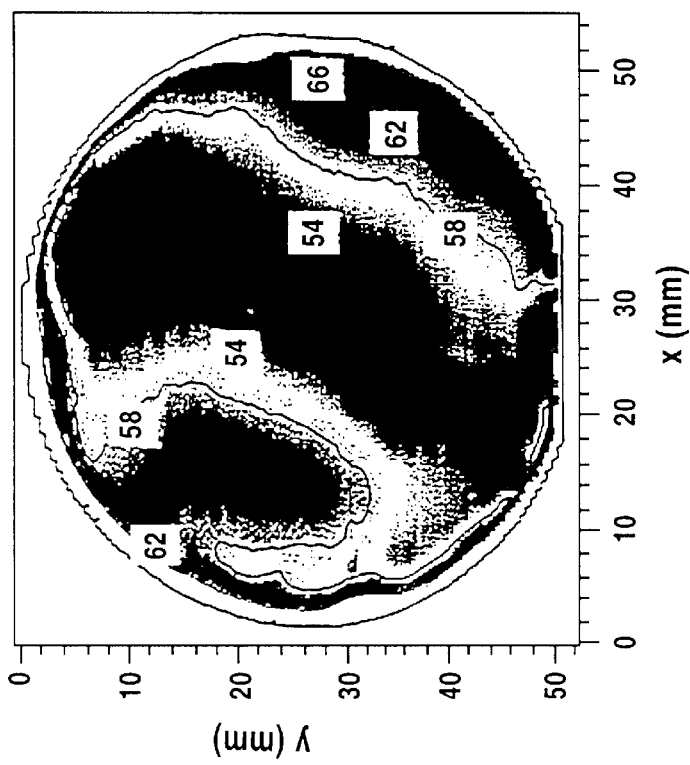
Figure 12A:
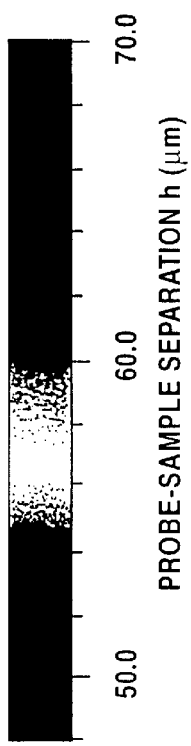

In practice, the method and apparatus of the present invention were utilized with respect to a thin film of $YBa_2Cu_3O_{7-\delta}$ on a sapphire substrate. A probe with a 480 $\mu$m diameter center conductor and a scanning near-field microwave microscope were calibrated as illustrated with respect to FIG. 3, using a calibration sample as shown in FIG. 7. A 2 inch diameter wafer of $YBa_2Cu_3O_{7-\delta}$, having a variable sheet resistance, was scanned with the calibrated probe to result in a pair of images $\Delta$f(x,y) and Q(x,y) of the sample (FIGS. 11(*a*) and 11(*b*)). These images were converted into topographic images on a point by point basis, as shown in FIG. 12A. The images where then converted into a plot of sheet resistance $R_x$(x, y), as shown in FIG. 12B. The topographic image correctly showed a probe-sample separation of 50 $\mu$m at the point where the probe-sample separation was optically determined to be 50 $\mu$m. This point is located in the middle of the wafer shown in FIG. 12. Topography was confirmed utilizing a DEK-TAK (tm) surface profilometer, which was used to scan across the wafer. These profilometer scans quantitatively agree with the values obtained in the topographic image, validating the ability of the present invention to disentangle sample topography and sheet resistance.

Figure 16:
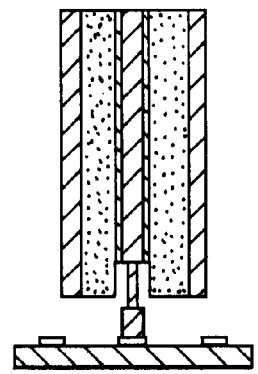
FIG. 16. illustrates a microwave probe in contact with a sample, in one embodiment of the invention.
Figure 17A:
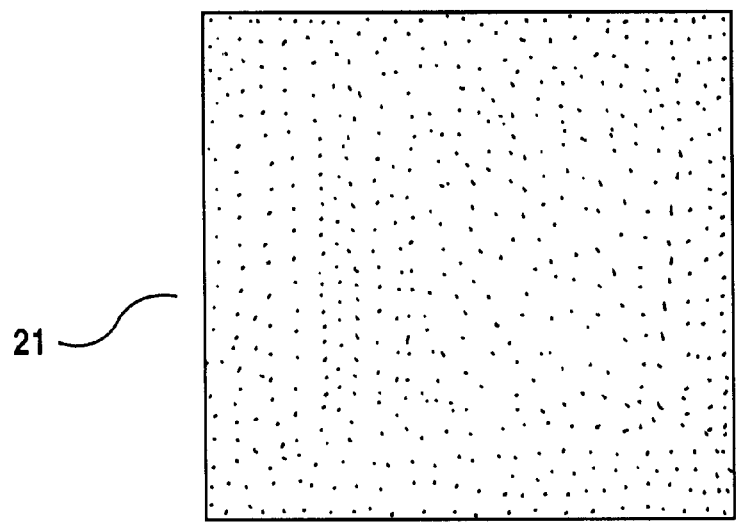

It should be noted that the above-discussed embodiment refers to calibration and scanning in a non-contact manner. The invention also operates in a contact-mode as shown in FIG. 16, which can broaden the possibilities of physical properties to be identified. Instead of disentangling one sample property and topography (h), this contact-mode embodiment can, instead, disentangle two sample properties P1 and P2, since sample topography no longer has an effect. For example, consider a sample 21, as shown in FIGS. 17A–17D with two physical properties: 1) a metallic thin film 22 with variable sheet resistance $R_x$=$\rho$/t, where $\rho$ is the resistivity and t is the metal film thickness; 2) a dielectric thin film 23 with a variable dielectric film thickness d. The calibration sample would have a variation in sheet resistance in one direction, and a variation in dielectric film thickness in the perpendicular direction. Such a sample would be scanned in contact mode. The variations in sheet resistance would show up primarily, but not exclusively in the Q of the microscope while the variations in the dielectric film thickness, d, would show up mainly in the frequency shift $\Delta$f. Surfaces of measured $\Delta$f ($R_x$, d) and Q ($R_x$, d) versus $R_x$ and d would be constructed. One would then use the same procedure as is done with the non-contact data to convert a contact-mode image of $\Delta$f (x, y) and Q (x, y) into two separate images of $R_x$ (x, y) and d (x, y).

Figure 13:
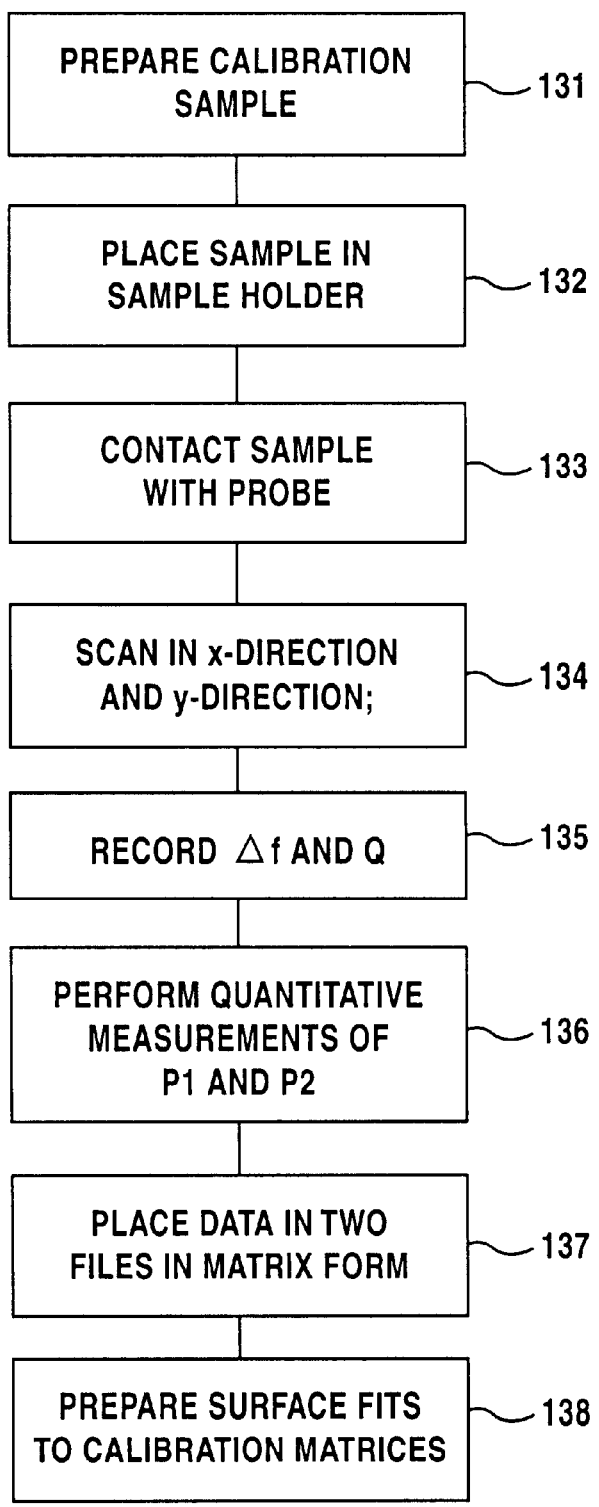
FIG. 13 illustrates calibration steps in a contact mode.

In the contact mode, calibration is performed according to FIG. 13. In step 131, an appropriate calibration sample is provided. The calibration sample should vary along two perpendicular axes, such as property P1 varying along the x direction, and a property P2 varying along the y direction. As an alternative, it is possible to utilize multiple separate calibration samples instead of one sample. The prepared sample or samples are placed in the sample holder at step 132, and the probe is contacted with the sample at step 133. The calibration sample or samples are then scanned in the x and the y directions in step 134 with the position along the x axis determining the value of property P1 being observed, and the position along the Y-axis determining the value of property P2 being observed. As in the non-contact embodiment, $\Delta$f and Q are recorded during all scans, as shown by step 135. Quantitative measurements of the properties of interest P1 and P2 are then made in step 136 by an independent method in a grid pattern across the calibration sample. Then, the data from the calibration sample is placed in two files, the first containing Δf (P1, P2) data, and the second containing Q (P1, P2) data, in a matrix form at step 137. The first column of both matrices should have the value of sample property P1, the first row should have the value of sample property P2, as measured in the independent quantitative measurements. A program similar to the Determine fits.NB program is prepared and run at step 138, using these two matrix files as input. The output will be surface fit functions for the calibration matrices.

After the contact-mode calibration, a sample with unknown properties P1 and P2 can be scanned in contact mode. The scanning steps in contact mode are essentially the same scanning steps which are illustrated in FIG. 10 regarding the non-contact mode. The difference in contact mode, however, is that the scan occurs with the probe contacting the sample, with the output being P1 (x, y) and P2 (x, y), rather than h and $R_x$.

The hardware necessary to carry out the invention is the probe, resonator, capacitor, and other elements which are illustrated in FIG. 1, combined with an appropriate data processing device in order to run the various computer programs and plot the necessary functions. Such a data processing device can include, as an example, a personal computer which is configured to run appropriate software to perform the steps associated with the present invention, in order to determine the unknown quantities from the known quantities after scanning, thereby disentangling the undesirable quantities from the physical property which is desired to be determined.

It will be apparent to a person of skill in the art that the above-discussed embodiment is for illustrative purposes only, and should not be interpreted as limiting the spirit and scope of the invention in any way. The present invention can easily be modified to measure physical properties such as, in addition to sheet resistance, film thickness, surface resistance, inductance, kinetic inductance for superconductors, dielectric constants, dielectric loss tangents, ferroelectric polarization, magnetic permeability, magnetic loss, spontaneous magnetization, ferromagnetic resonance frequency, ferromagnetic resonance line width, spin wave resonance, and electron paramagnetic resonance frequency, in addition to numerous other physical properties. In non-contact mode, this method is valid as long as a single physical property of the material plays a significant part in the response with a scanning device such as a microwave microscope, in addition to variations of an undesirable "noise" source such as topography. In contact mode, this method is valid as long as two physical properties play significant parts in the response of the scanning device. To properly understand the spirit and scope of the present invention, reference should be made to the appended claims.

What is claimed is:

1. A method for disentangling sample properties in a scanned sample, said method comprising:

scanning a calibration sample, said calibration sample having a first property and a second property which are variable;

recording values representing a first measured variable and a second measured variable for the calibration sample during the scan;

making quantitative measurements of the sample properties of interest at a plurality of points across the calibration sample;

using the quantitative measurements to mathematically generate conversion functions which take the first measured variable and the second measured variable as input, and have values representing the first property and the second property as output;

scanning an unknown sample for which the first property and the second property are unknown, and measuring the first variable and the second variable for the sample during the scan; and using the conversion functions combined with the measured first variable and second variable for the unknown sample to compute the first property and the second property for the unknown sample.

2. A method for disentangling sample properties in a scanned sample as recited in claim 1, wherein the first property is separation between the probe and the sample.

3. A method of disentangling sample properties as recited in claim 2, wherein an absolute height of the probe above the calibration sample is determined by contacting the calibration sample with the probe, and defining this position as height zero.

4. A method of disentangling sample properties as recited in claim 2, wherein the first measured variable is frequency shift Δf.

5. A method of disentangling sample properties as recited in claim 4, wherein the second variable is quality factor Q.

6. A method of disentangling sample properties as recited in claim 5, wherein the probe comprises a coaxial cable with an open end.

7. A method of disentangling sample properties as recited in claim 5, wherein the probe comprises a coaxial cable, with the center conductor connected to the outer conductor with a loop.

8. A method of disentangling sample properties as recited in claim 5, wherein the sample property of interest is sheet resistance.

9. A method of disentangling sample properties as recited in claim 8, wherein scanning the calibration sample comprises scanning a variable-thickness conducting thin film.

10. A method of disentangling sample properties as recited in claim 1, wherein the sample being scanned is in contact with the probe.

11. A method of disentangling sample properties as recited in claim 10, wherein the first property of the calibration sample varies along one axis, and the second property of the calibration sample varies along a second axis perpendicular to the first axis.

12. A method of disentangling sample properties as recited in claim 10, wherein the first measured variable is frequency shift Δf.

13. A method of disentangling sample properties as recited in claim 12, wherein the second variable is quality factor Q.

* * * * *